A. KÖNIG.
DOUBLE TELESCOPE.
APPLICATION FILED APR. 28, 1908.

908,279.

Patented Dec. 29, 1908.

Witnesses:
Paul Kriegel
Fritz Sander

Inventor:
Albert König

UNITED STATES PATENT OFFICE.

ALBERT KÖNIG, OF JENA, GERMANY, ASSIGNOR TO THE FIRM OF CARL ZEISS, OF JENA, GERMANY.

DOUBLE TELESCOPE.

No. 908,279.  Specification of Letters Patent.  Patented Dec. 29, 1908.

Application filed April 28, 1908. Serial No. 429,612.

*To all whom it may concern:*

Be it known that I, ALBERT KÖNIG, a citizen of the German Empire, and residing at Carl-Zeiss strasse, Jena, in the Grand Duchy of Saxe-Weimar, Germany, have invented a new and useful Double Telescope, of which the following is a specification.

The invention is an improvement on the stereo-telescope described in the Patent No. 807,713 and consisting of two single telescopes and a guiding-jacket enveloping them and fitted with openings for the entrance of the rays and for the ocular tubes, so that by moving the single telescopes relatively to one another the distance between the exit axes may be adapted to the interpupilary distance of the observer. A double telescope of that kind can without difficulty be converted into a double telescope with elevated entrance axes in order to enable observations being made over the top of some obstacle sheltering the observer. Each single telescope need only be provided with a compound objective prism system, so that the entrance axes are placed above the jacket in which both telescopes are fitted. Another way to the same result, which is not so simple, but which has the merit of dispensing with the compound objective prism systems, forms the object of the present invention. If the fore part only of each single telescope be enveloped in the jacket—in other words, not only the ocular tube, but the entire after part of the telescope arranged so as to protrude through an opening in it—the ocular tube can be placed at a lower level than the jacket and by that means the elevation of the entrance axes above the exit axes effected.

Figure 1:
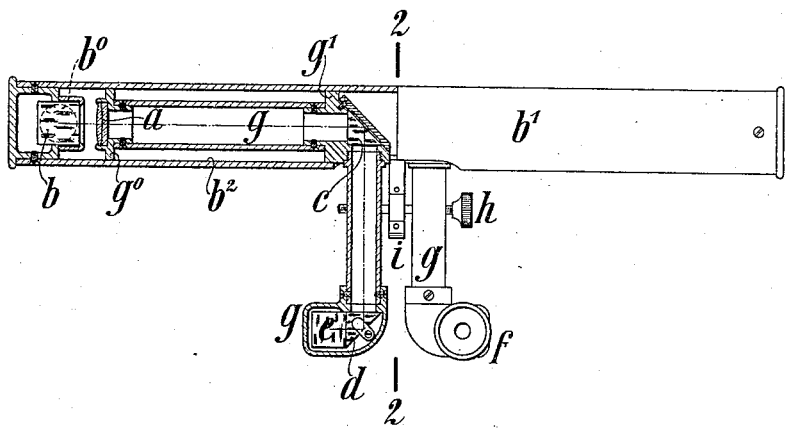
Figure 2:
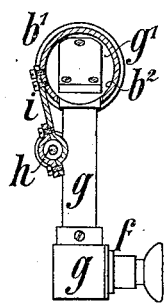

In the annexed drawing: Figure 1 is an elevation partly in section of a double telescope constructed according to the invention. Fig. 2 is a section of the same telescope along the line 2—2 of Fig. 1.

The two objective prisms $b$, lying as usual in front of the objectives $a$, are tightly mounted in the openings $b^0$ at the ends of the jacket $b^1$. The erection of each image is effected by a set of Porro prisms $b\ c\ d\ e$. These prism systems are at the same time instrumental in increasing the distance between the entrance axes and, in addition thereto, in placing the exit axes at a lower level than the entrance axes. The oculars $f$ lie behind the prisms $e$.

Each telescope casing $g$ includes all the optical parts with the exception of the front prism $b$. In the example shown both casings are supposed to be slidable in the jacket $b^1$. They are for this purpose fitted with annular pieces $g^0\ g^1$ which tightly fit the cylindrical guiding surface $b^2$ of the jacket $b^1$. For adjusting the distance between the telescopes, a double screw $h$, engaging one and the other of the casings $g$ with right and left-handed threads respectively, is journaled in the bracket $i$ fixed to the jacket $b^1$.

I claim:

The combination, of a stereo-telescope having the objectives and the objective prisms elevated above the oculars, with a jacket enveloping the fore parts of the single telescopes and fitted with openings for the entrance of the rays and for the after parts of the single telescopes and with a guiding surface for adapting the distance between the single telescopes to the interpupilary distance of the observer.

ALBERT KÖNIG.

Witnesses:
 PAUL KRUZER,
 FRITZ SANDER.